United States Patent [19]
Bollig et al.

[11] Patent Number: 5,794,493
[45] Date of Patent: Aug. 18, 1998

[54] FOUR-CYLINDER MACHINE OF THE RECIPROCATING PISTON TYPE HAVING BALANCING MEANS

[75] Inventors: Christoph Bollig, Stolberg; Werner Bick, Würselen; Jürgen Dick, Aachen; Bernd Jung, Aachen; Daniel Perak, Aachen, all of Germany

[73] Assignee: FEV Motorentechnik GmbH & Co. KG, Aachen, Germany

[21] Appl. No.: 777,385

[22] Filed: Dec. 27, 1996

[30] Foreign Application Priority Data

Dec. 27, 1995 [DE] Germany ............... 295 20 557 U

[51] Int. Cl.$^6$ ................... F02B 75/06; F16F 15/26
[52] U.S. Cl. .......................... 74/603; 123/192.2
[58] Field of Search ............... 74/603, 604, 589, 74/590, 591, 592; 123/192.2, 192.1

[56] References Cited

U.S. PATENT DOCUMENTS

| | | | |
|---|---|---|---|
| 5,588,407 | 12/1996 | von Essen et al. | 123/192.2 |
| 5,653,203 | 8/1997 | Von Essen et al. | 123/192.2 |

FOREIGN PATENT DOCUMENTS

| | | | |
|---|---|---|---|
| 23 33 038 | 1/1975 | Germany | 123/192.1 |
| 36 07 133 | 9/1987 | Germany | 74/604 |
| 44 41 798 | 6/1995 | Germany . | |
| 102842 | 6/1983 | Japan | 74/603 |

*Primary Examiner*—Charles A. Marmor
*Assistant Examiner*—Mary Ann Battista
*Attorney, Agent, or Firm*—Spencer & Frank

[57] ABSTRACT

A four-cylinder, reciprocating piston-machine includes a crankshaft having a rotary axis; a center bearing supporting the crankshaft; two outer bearings flanking the center bearing and supporting the crankshaft; and first, second, third and fourth torsion springs extending parallel to the crankshaft axis. The first and second torsion springs are parallel to and facing a first side of a reference plane containing the crankshaft axis, while the third and fourth torsion springs are parallel to and facing a second side of the reference plane. First, second, third and fourth elongated balancing masses are secured to and extending unidirectionally from respective first, second, third and fourth torsion springs toward the crankshaft in a perpendicular orientation to the crankshaft axis. The first and second balancing masses are situated at the outer bearings, while the third and fourth balancing masses are situated at the center bearing. First, second, third and fourth control cams are keyed to the crankshaft and are in engagement with the respective first, second, third and fourth balancing masses for oscillating the balancing masses toward and away from the crankshaft axis to exert varying torques to the respective torsion springs.

8 Claims, 5 Drawing Sheets

5,794,493

FOUR-CYLINDER MACHINE OF THE RECIPROCATING PISTON TYPE HAVING BALANCING MEANS

CROSS REFERENCE TO RELATED APPLICATION

This application claims the priority of German Application No. 295 20 557.1 filed Dec. 27, 1995, which is incorporated herein by reference.

BACKGROUND OF THE INVENTION

This invention relates to a four-cylinder machine of the reciprocating piston type, particularly an internal combustion engine, provided with mass equalizing (balancing) means. In such machines balancing masses have to be provided for equalizing the free mass-based forces. Such balancing masses may be orbiting eccentric weights supported on additional shafts and being driven by the crankshaft.

German Offenlegungsschrift (application published without examination) 44 41 798 discloses a reciprocating piston-type machine in which the balancing masses are pivotal levers supported by the engine block via torsion springs. The pivotal motion of the balancing masses is effected by respective control cams mounted on the crankshaft. The German Offenlegungsschrift further discloses that for a multicylinder in-line engine parallel-extending torsion springs are provided on both sides of the crankshaft. Each torsion spring is fixedly clamped at one end and is rotatably supported at the other end where the pivoting, arm-like balancing mass is arranged.

The above-outlined conventional system has the disadvantage that because of the unavoidable mutual asymmetry of the balancing masses, torques are generated about the vertical engine axis and because of the magnitude of the balancing masses and the related magnitude of the bias force of the torsion springs, significant Hertz-pressures appear between the control cam and the associated balancing weights.

SUMMARY OF THE INVENTION

It is an object of the invention to provide an improved four-cylinder, in-line machine of the above-outlined type which has a mass balancing system that avoids the above-discussed disadvantages of the prior art system.

This object and others to become apparent as the specification progresses, are accomplished by the invention, according to which, briefly stated, the four-cylinder, reciprocating piston-machine includes a crankshaft having a rotary axis; a center bearing supporting the crankshaft; two outer bearings flanking the center bearing and supporting the crankshaft; and first, second, third and fourth torsion springs extending parallel to the crankshaft axis. The first and second torsion springs are parallel to and facing a first side of a reference plane containing the crankshaft axis, while the third and fourth torsion springs are parallel to and facing a second side of the reference plane. First, second, third and fourth elongated balancing masses are secured to and extending unidirectionally from respective first, second, third and fourth torsion springs toward the crankshaft in a perpendicular orientation to the crankshaft axis. The first and second balancing masses are situated at the outer bearings, while the third and fourth balancing masses are situated at the center bearing. First, second, third and fourth control cams are keyed to the crankshaft and are in engagement with the respective first, second, third and fourth balancing masses for oscillating the balancing masses toward and away from the crankshaft axis to exert varying torques to the respective torsion springs.

By virtue of the invention as outlined above, the balancing weights are halved as compared to the conventional balancing weights so that accordingly, the required torques of the torsion springs and therefore also the Hertz-pressures between the balancing weights on the one hand and the control cam of the crankshaft on the other hand are reduced by one half. The invention furthermore makes it possible to also halve the pivotal angle of the balancing masses so that the balancing masses are submerged to a lesser extent into the oil contained in the oil pan of the crankcase. The reduction of the Hertz-pressures between the control cam and the associated balancing mass makes it possible to interpose low-friction roller bearings for transmitting the pivotal motion from the control cam to the balancing mass. Such an arrangement is of particular significance in case of rapidly rotating machines.

According to an advantageous feature of the invention, the two outer (flanking) balancing masses on the one hand and the two inner balancing masses on the other hand are oppositely arranged relative to one another for cancelling the torque about the vertical machine axis.

According to a further advantageous feature of the invention, the torsion springs of the outer balancing masses are anchored in the region of the central crank shaft bearing and the torsion springs of the inner balancing masses are anchored in the region of the respective outer crankshaft bearings and further, the torsion springs are rotatably supported at their respective other end. Such an arrangement provides that the torsion springs are at a staggered height relative to the rotary axis of the crankshaft so that at least a partial equalization of the alternating torques is achieved.

According to yet another advantageous feature of the invention a base frame is provided for anchoring and supporting the torsion springs. The base frame is connectable with the cylinder block of the engine and has carrier shoes on both ends as well as in the region of the central crankshaft bearing. This arrangement has the advantage that the mass balancing assembly may be secured to the cylinder block as a closed, pre-assembled structural unit formed of the balancing weights and the torsion springs. The respective ends of the torsion springs are anchored or rotatably supported on the carrier cheeks, dependent upon their relationship to the balancing masses.

According to a further advantageous feature of the invention, the base frame is provided with transverse webs between adjoining supporting shoes and further, on the side of the base frame which is oriented towards the cylinder block, the carrier shoes and the transverse webs form bearing covers for the crankshaft bearings. This arrangement has the advantage that not only the mass balancing system but the entire crankshaft bearing system for a five-fold supported crankshaft of a four cylinder machine may be manufactured as a closed, complete structural unit. In this manner not only the manufacturing accuracy is increased but also the assembling operation is facilitated.

According to yet another advantageous feature of the invention, each balancing mass which is coupled fixedly with a respective torsion spring has a bearing bore which is coaxial with the torsion spring and which is provided with rolling bodies that support the balancing mass by means of a shaft stub coupled with the cylinder block. Such an arrangement ensures that the torsion springs will be maintained practically free from bending stresses.

3

According to another additional feature of the invention, each balancing mass is provided with a recess in which a rotary member (bearing ball or bearing roller) is supported which, in turn, is in engagement with the associated control cam and thus acts as a follower. By virtue of this arrangement, relatively large-diameter rotary members may be used which is of particular advantage if the rotary member forms a roller bearing or particularly a ball bearing since in such a case favorable load carrying magnitudes may be achieved.

DESCRIPTION OF THE PREFERRED EMBODIMENT

Figure 1:
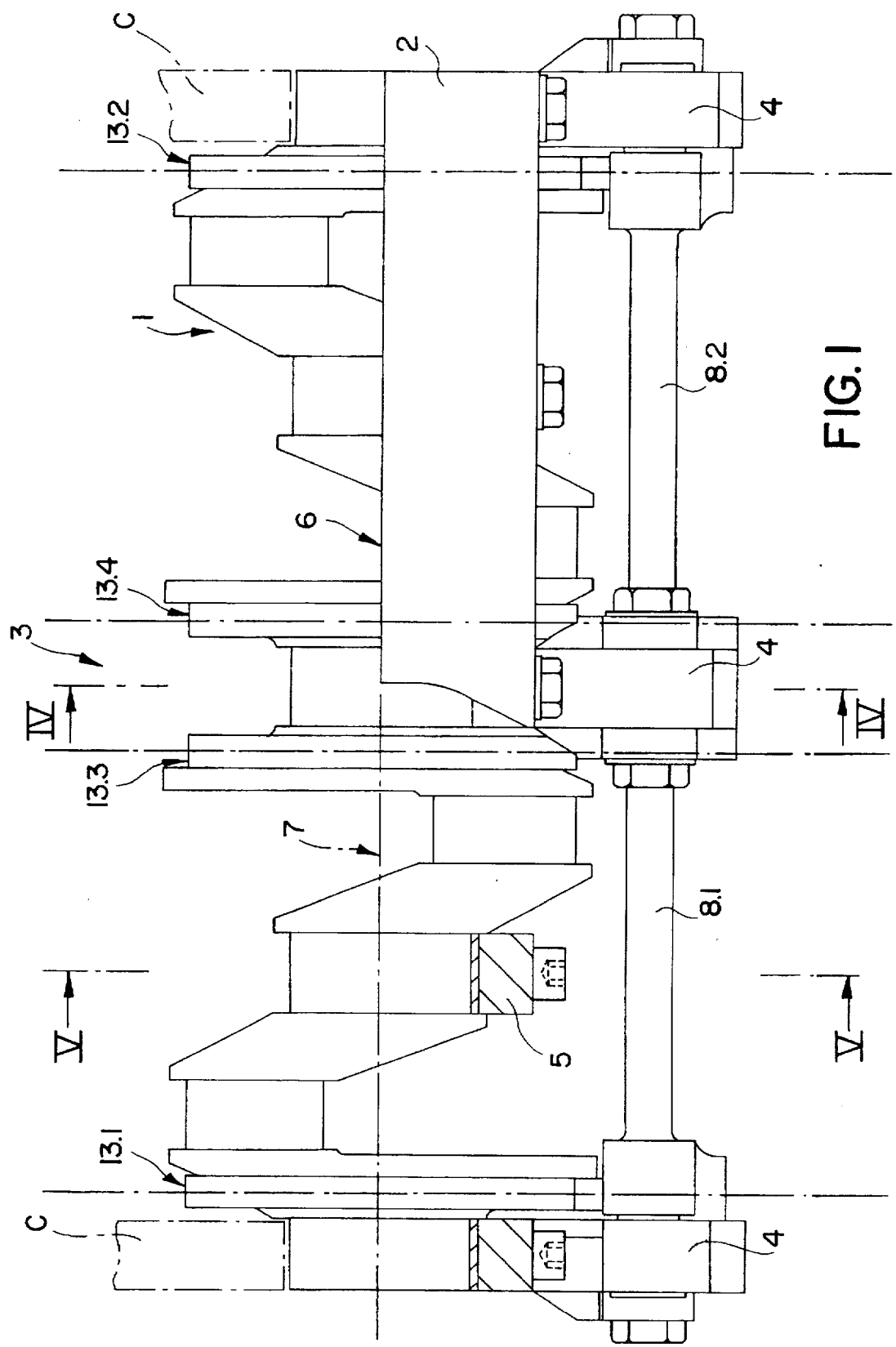
FIG. 1 is a partially sectional side elevational view of a preferred embodiment of the invention.
Figure 3:
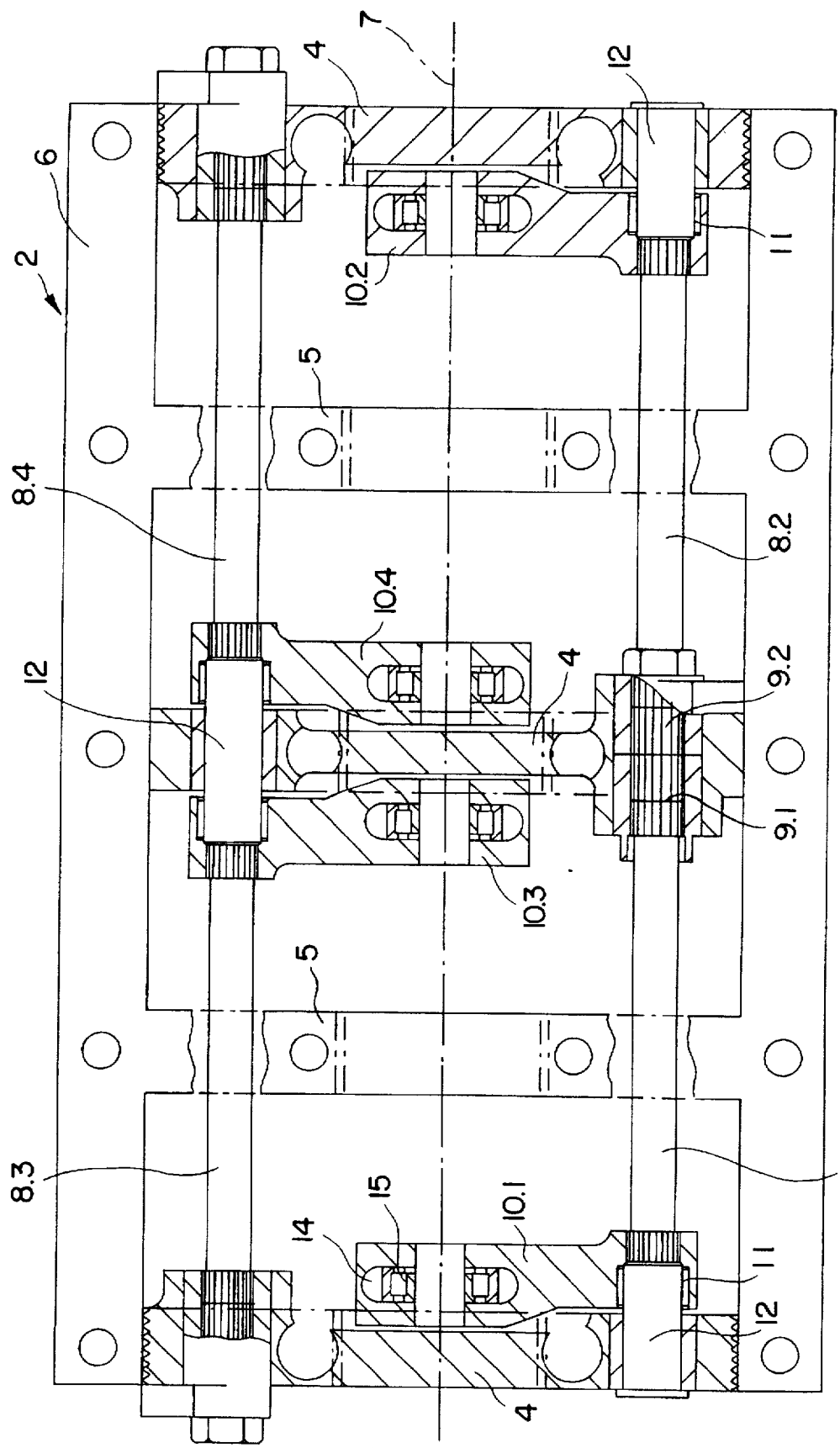
FIG. 3 is a partially sectional top plan view of the structure illustrated in FIG. 1.

Turning to FIGS. 1 and 3, a base frame 2 is provided for supporting a crankshaft 1 and a mass balancing system to be described in detail later. The base frame 2 has carrier shoes 4 at its axial ends, as viewed parallel to the direction of the crankshaft axis 7 and in the region of the central bearing 3 of the crankshaft 1. Transverse webs 5 are positioned between the carrier shoes 4. The carrier shoes 4 and the transverse webs 5 form bearing covers for the crankshaft 1 at their side oriented towards the cylinder block, indicated by parts C. The face 6 of the base frame 2 oriented towards the cylinder block forms the dividing plane for the bearings of the crankshaft 1.

Torsion springs 8.1, 8.2, 8.3 and 8.4, all held in the base frame 2, are arranged at a level below the horizontal halving plane 6 containing the crankshaft axis 7 and parallel to the crankshaft axis 7 and on either side of a vertical halving plane (reference plane) containing the crankshaft axis 7.

As it may be particularly well observed in FIG. 3, one end of the torsion springs 8.1 and 8.2 is held against rotation by the central carrier shoe 4, for example, by means of splines 9.1, 9.2. Additional setting means provide the possibility to set the torsion springs 8.1 and 8.2 to a predetermined bias. The respective other end of the two torsion springs 8.1 and 8.2 is torque-transmittingly coupled with a respective balancing mass 10.1 and 10.2. The balancing masses 10.1 and 10.2 each have a coaxial bearing bore 11 into which extends a respective stub shaft 12, and the balancing masses 10.1 and 10.2 are rotatably supported on the stub shafts 12 by rolling bodies, for example, by rolling pins.

The torsion springs 8.3 and 8.4 are, at one end, fixedly supported in the respective outer carrier shoes 4 in a manner similar to the torsion springs 8.1 and 8.2, whereas at their respective other end the torsion springs 8.3 and 8.4 are connected with respective balancing masses 10.3 and 10.4. The balancing masses 10.3 and 10.4 are, as in the case of the balancing masses 10.1 and 10.2, provided with bearing bores 11 which accommodate rolling bodies that circumferentially engage a stub shaft 12 held in the center carrier shoe 4.

Figure 2:
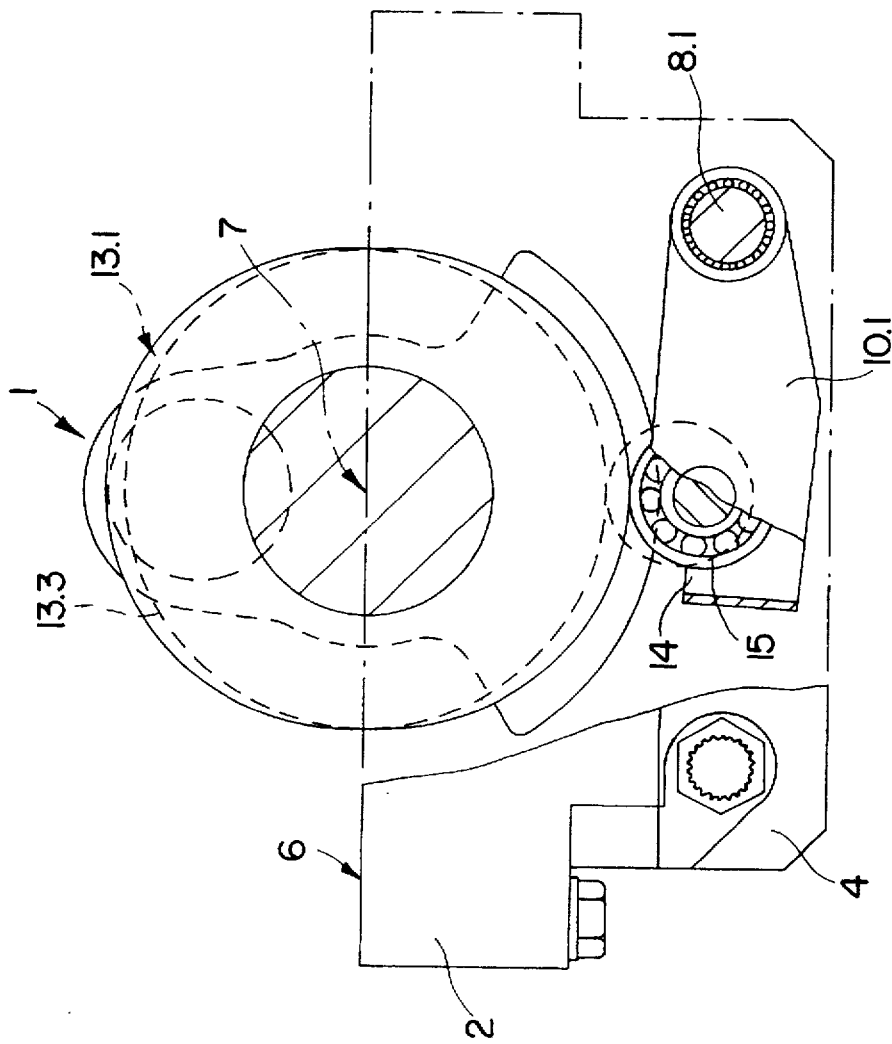
FIG. 2 is a partially sectional end elevational view of the construction shown in FIG. 1.

As seen in FIGS. 2 and 3, the balancing masses 10.1–10.4 are elongated pivotal arms whose principal direction is perpendicular to the crankshaft axis 7. The two outer (flanking) balancing masses 10.1 and 10.2 are oriented oppositely to the two inner (central) balancing masses 10.3 and 10.4. By virtue of this arrangement, the forces and torques appearing upon rotation of the balancing masses have an oppositely oriented symmetrical pattern. As a result, the forces and torques derived therefrom and acting about the vertical machine axis are mutually compensated for in the horizontal plane and as intended, the forces derived from the motion of the balancing masses can be effective only in the vertical plane.

As seen in FIGS. 1 and 2, the crankshaft 1 carries control cams 13.1, 13.2, 13.3 and 13.4 which cooperate with the respective balancing masses 10.1, 10.2, 10.3 and 10.4.

The balancing masses 10.1–10.4 are each provided with a downwardly open recess 14 in which a rotary member 15, for example, a roller bearing is situated which acts as a follower as it rides on the associated control cam 13.1–13.4. At the same time, the respective balancing masses 10.1–10.4 are pressed against the respective control cams 13.1–13.4 by the associated torsion springs 8.1–8.4 with a preset biasing force.

Figure 4:
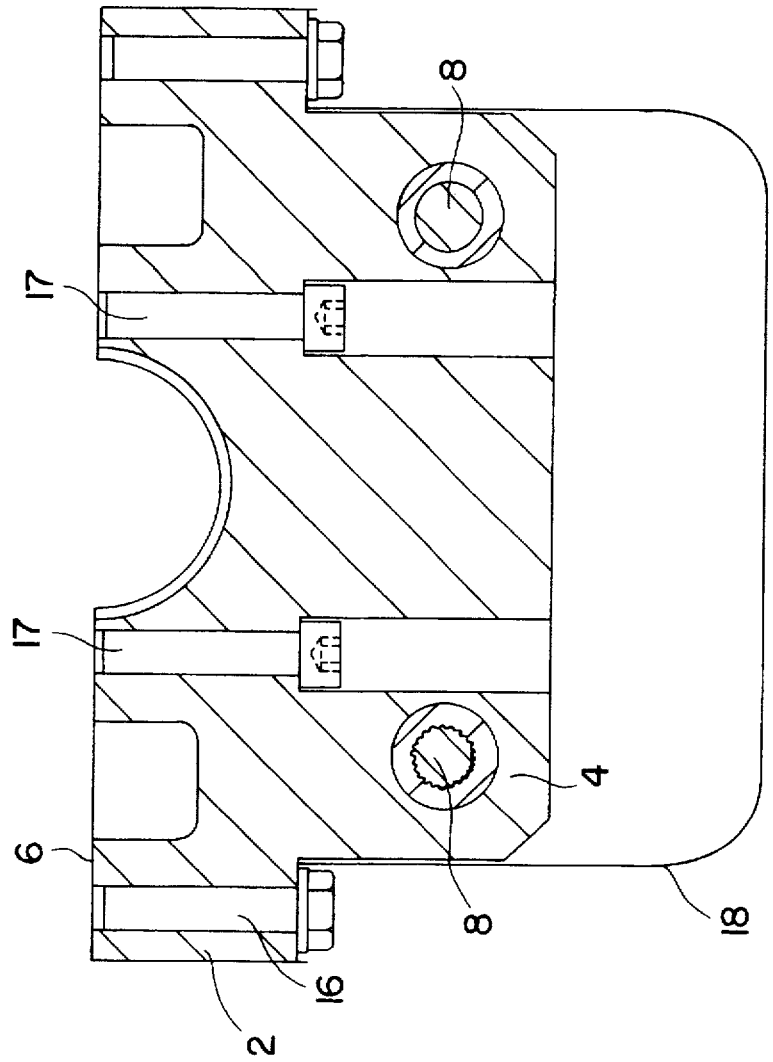
FIG. 4 is a sectional view taken along line IV—IV of FIG. 1.
Figure 5:
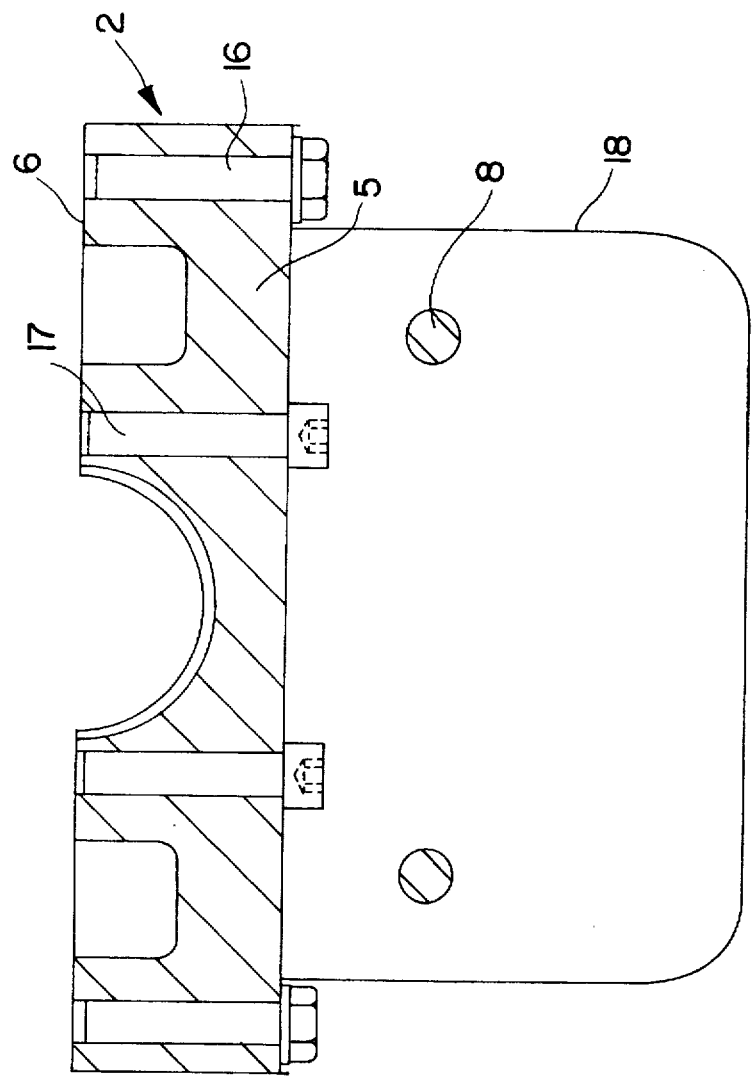
FIG. 5 is a sectional view taken along line V—V of FIG. 1.

FIGS. 4 and 5 show the arrangement of the carrier shoes 4 and the transverse webs 5 constituted as bearing webs. As seen in these Figures, the base frame 2 is secured by screws 16 to the foot of a cylinder block while screws 17 hold the bearing shell to close the crankshaft bearing. The screws 16 hold an oil pan 16 fixedly and in a hermetic manner.

It will be understood that the above description of the present invention is susceptible to various modifications, changes and adaptations, and the same are intended to be comprehended within the meaning and range of equivalents of the appended claims.

What is claimed is:

1. A four-cylinder, reciprocating piston-machine comprising (a) a crankshaft having a rotary axis;

(b) a center bearing supporting said crankshaft;

(c) two outer bearings flanking said center bearing and supporting said crankshaft;

(d) first, second, third and fourth torsion springs each having a length dimension extending parallel to said axis; said first and second torsion springs being parallel to and facing a first side of a reference plane containing said axis; said third and fourth torsion springs being parallel to and facing a second side of said reference plane; containing said axis;

(e) first, second, third and fourth elongated balancing masses being secured to and extending unidirectionally from respective said first, second, third and fourth torsion springs toward said crankshaft and being perpendicular to said axis; said first and second balancing masses being situated at respective said outer bearings; said third and fourth balancing masses being situated at said center bearing; and (f) first, second, third and fourth control cams keyed to said crankshaft and being in engagement with a surface of respective said first, second, third and fourth elongated balancing masses for oscillating said balancing masses toward and away from said axis to exert varying torques to said respective torsion springs.

2. The four-cylinder, reciprocating piston-machine as defined in claim 1, wherein said first and second balancing masses are oriented from the respective said first and second torsion springs in a first direction and said third and fourth balancing masses are oriented from the respective said third and fourth torsion springs in a second direction; said first and second directions being oppositely oriented.

3. The four-cylinder, reciprocating piston-machine as defined in claim 1, wherein each said torsion spring has opposite first and second ends; further comprising means for fixedly anchoring the first ends of said first and second torsion springs in a region of said center bearing and for fixedly anchoring said first ends of said third and fourth torsion springs in a region of respective said outer bearings; and means for rotatably supporting said second ends of said torsion springs.

4. The four-cylinder, reciprocating piston-machine as defined in claim 3, further comprising a cylinder block; wherein further each said torsion spring has a longitudinal spring axis; and further wherein said means for rotatably supporting said torsion springs comprise (a) a bearing bore provided in each said balancing mass; each said bearing bore being coaxial with the spring axis of the torsion spring to which the respective balancing mass is secured;

(b) a stub shaft held in said cylinder block and extending into a respective said bearing bore; and (c) rolling bodies situated in each said respective bearing bore for supporting the stub shaft extending thereinto.

5. The four-cylinder, reciprocating piston-machine as defined in claim 1, further comprising a cylinder block and a base frame extending along said crankshaft and connected to said cylinder block; said base frame including first and second carrier shoes situated in a region of said outer bearings, respectively, and a third carrier shoe situated in a region of said center bearing; said carrier shoes supporting said torsion springs.

6. The four-cylinder, reciprocating piston-machine as defined in claim 5, wherein said base frame comprises transverse webs disposed between adjoining said carrier shoes; said carrier shoes and said transverse webs forming, on a side oriented toward said cylinder block, bearing covers for said outer and center bearings.

7. The four-cylinder, reciprocating piston-machine as defined in claim 1, each said balancing mass having a recess accommodating a rotary member supported in the respective balancing mass; said rotary member riding on a respective said control cam.

8. The four-cylinder, reciprocating piston-machine as defined in claim 7, wherein said rotary member is constituted by a roller bearing.

* * * * *